Patented Feb. 14, 1950

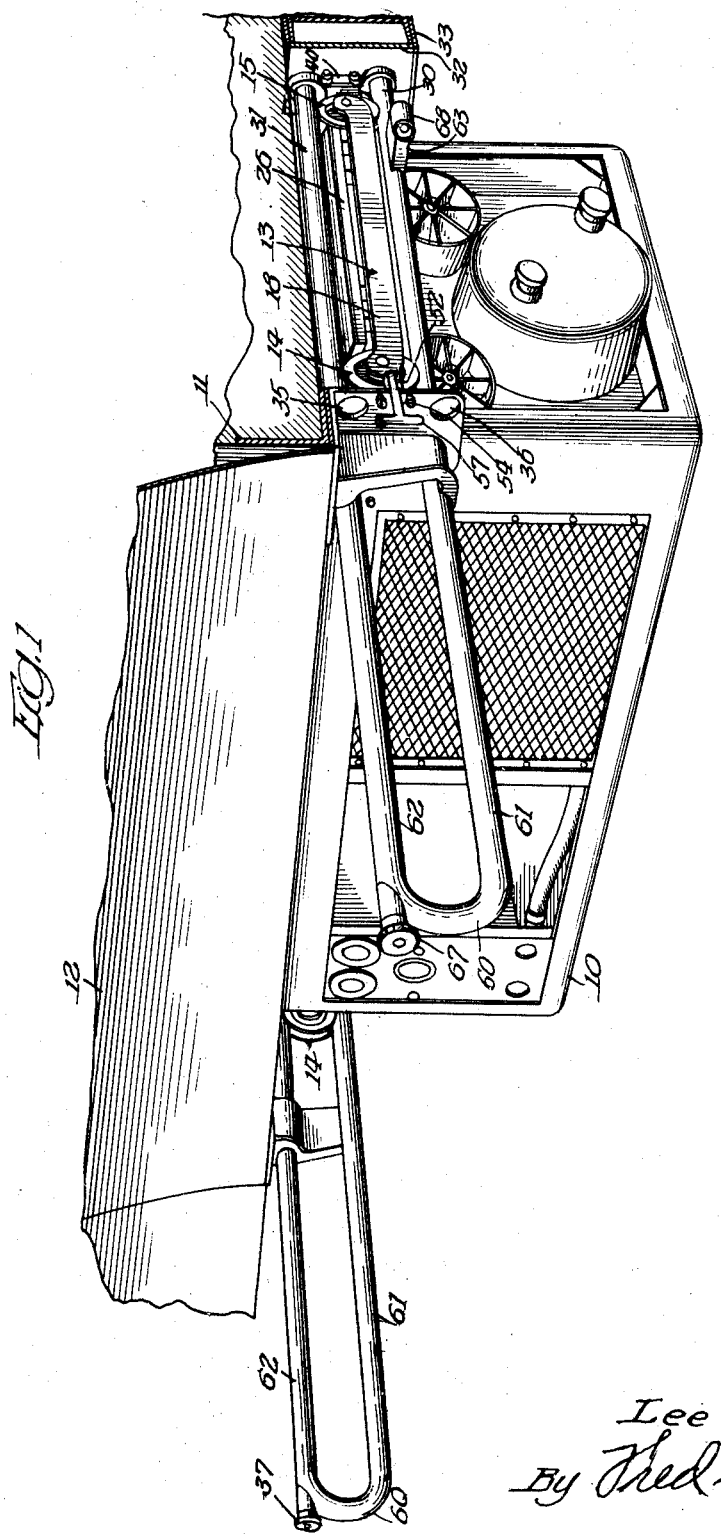

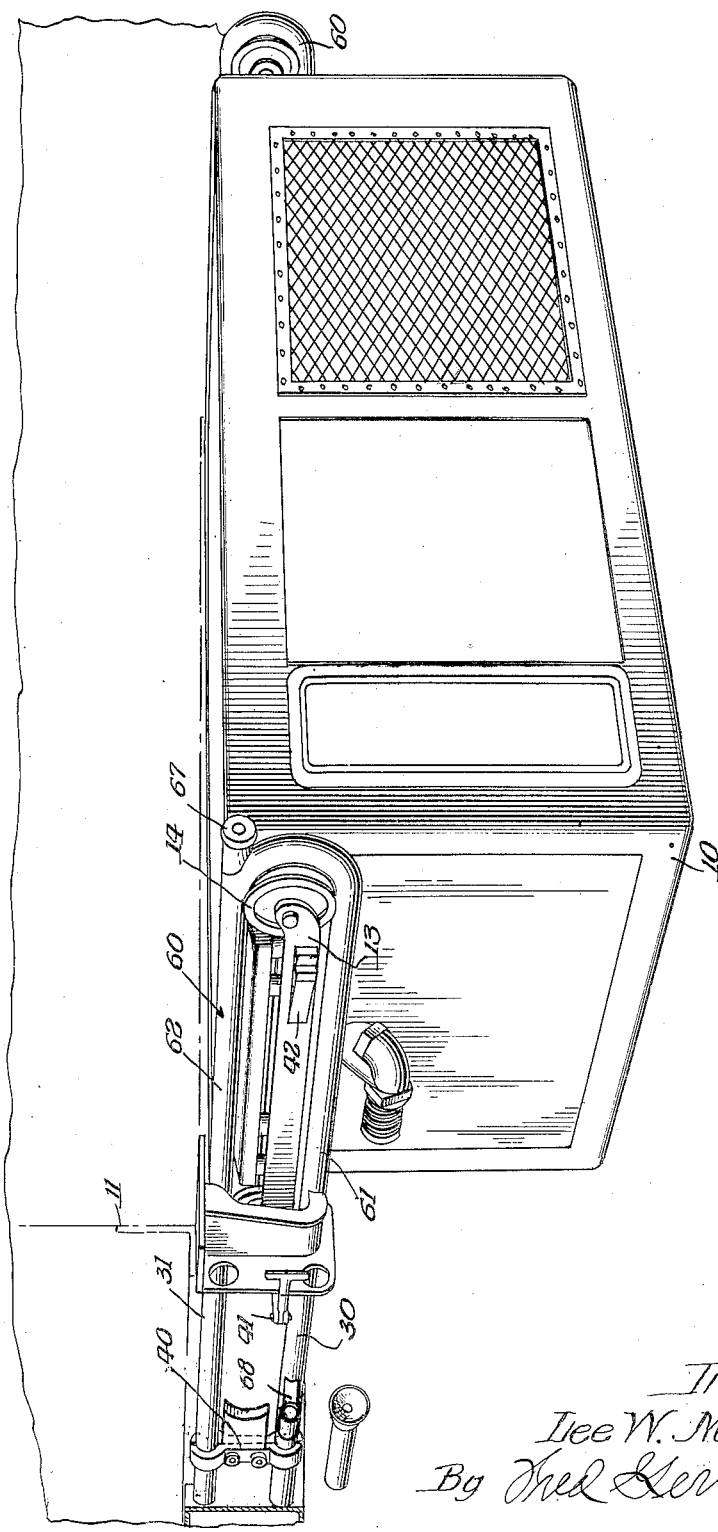

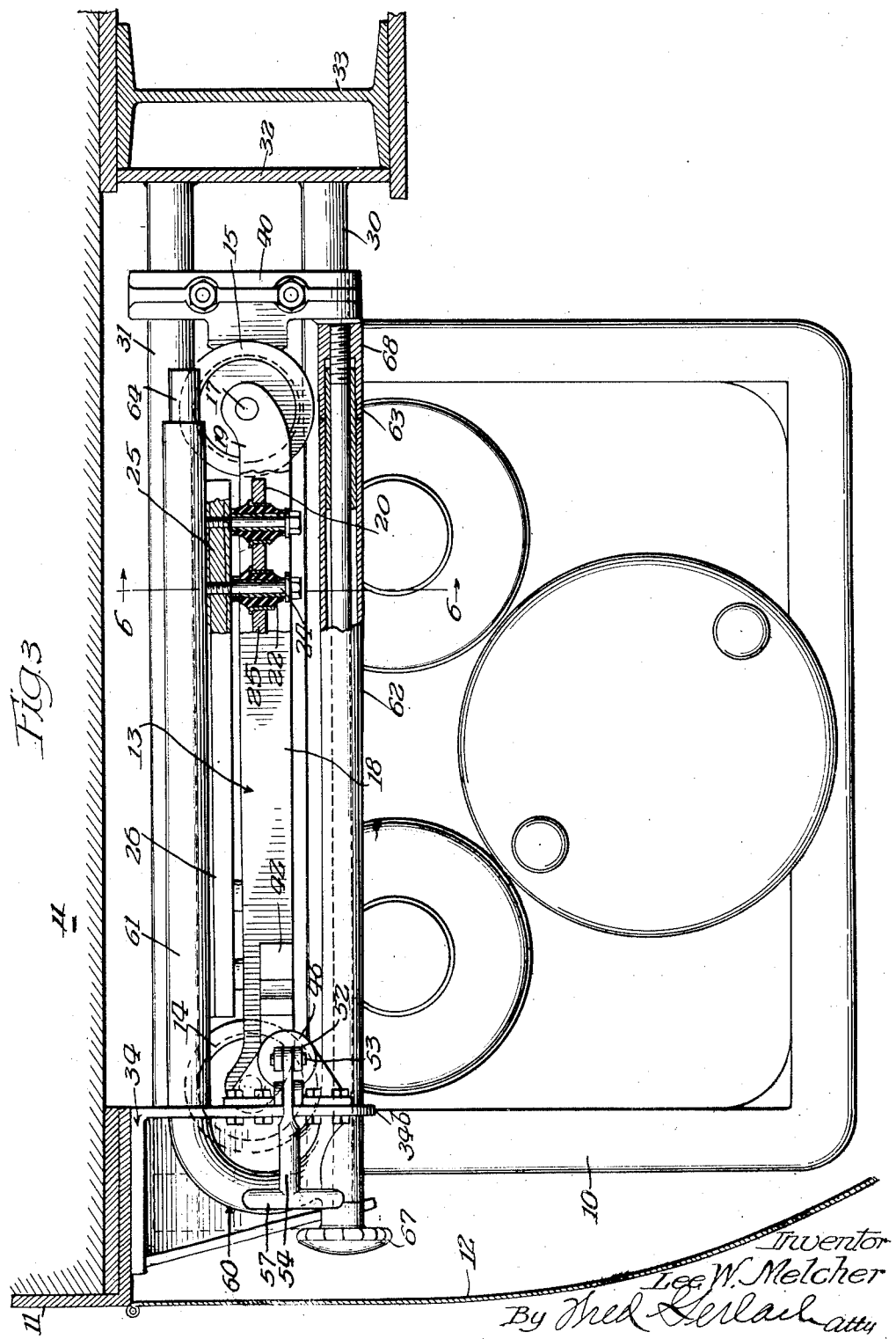

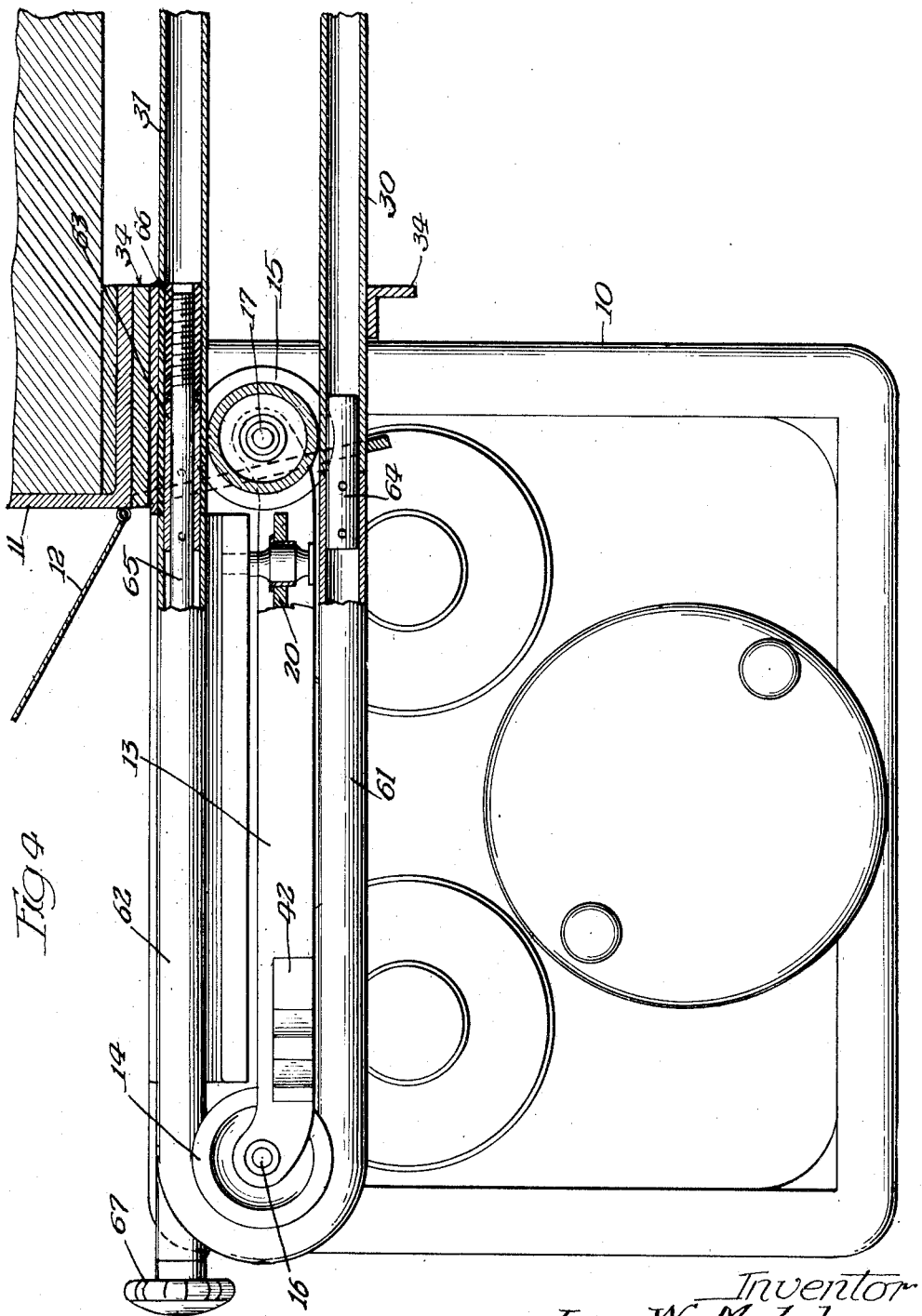

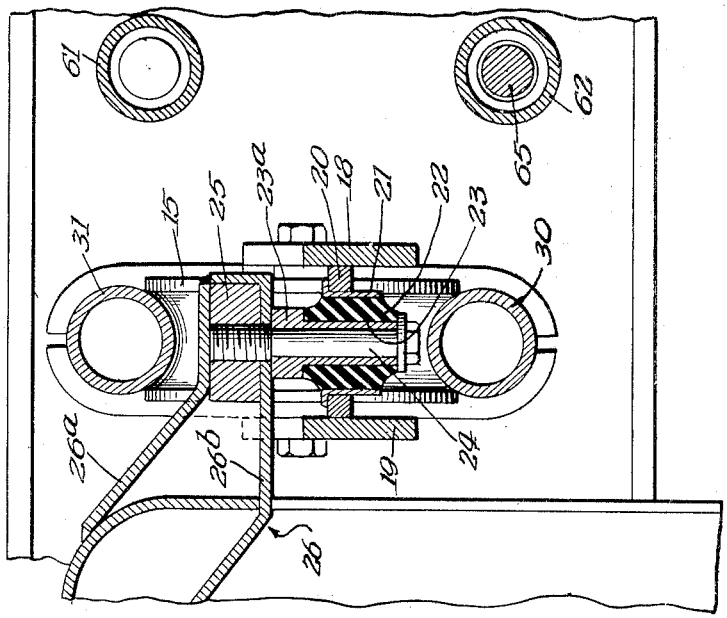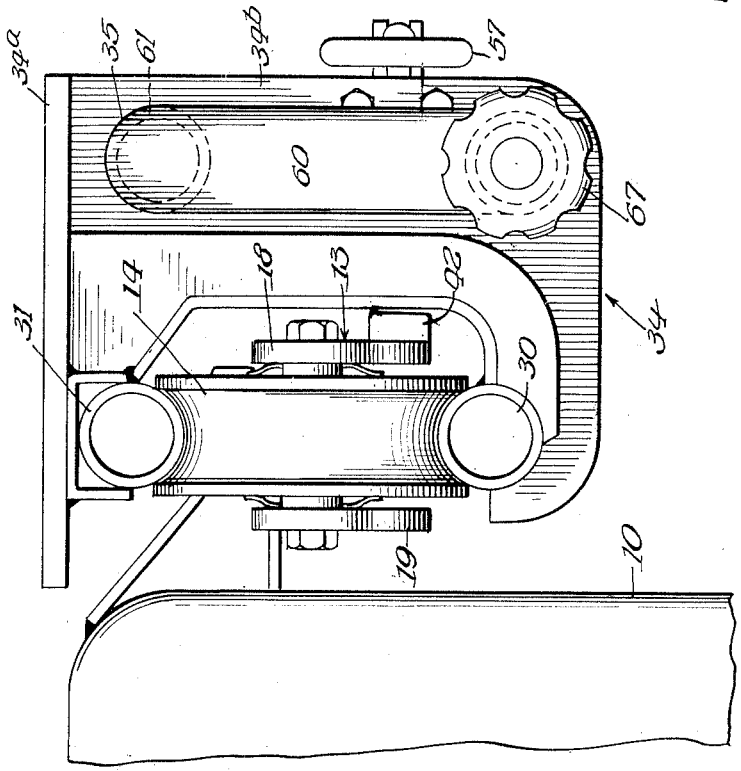

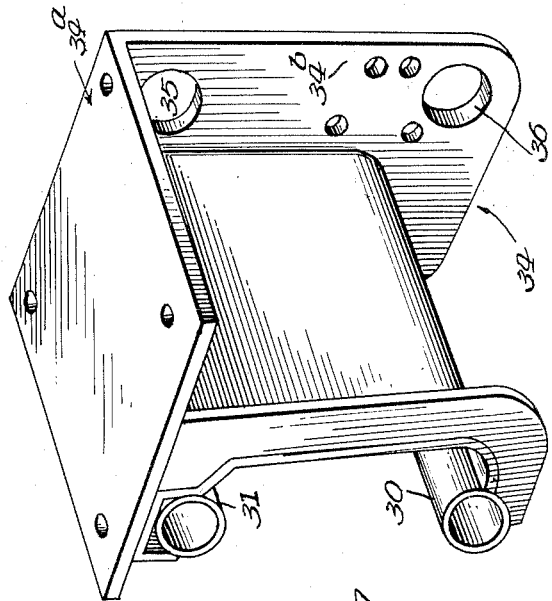
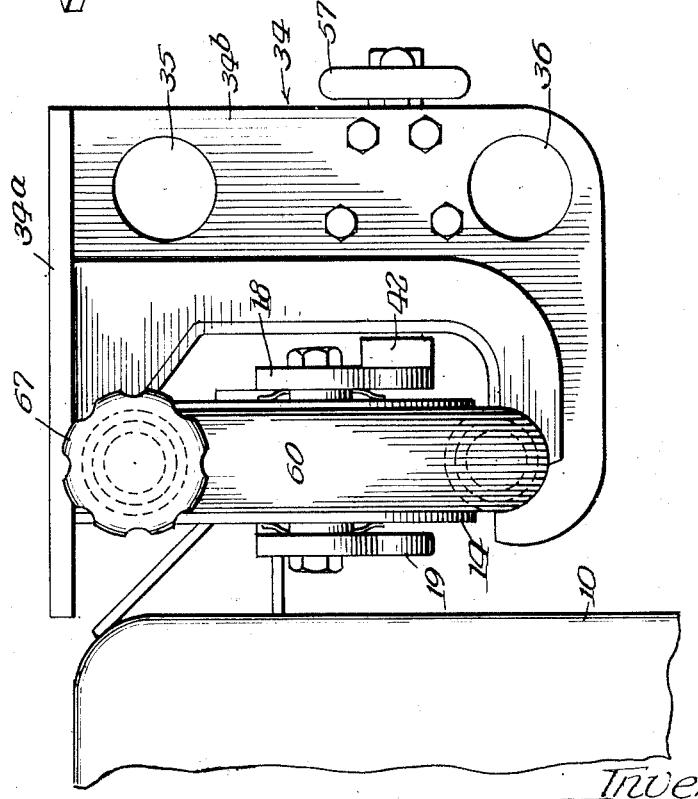

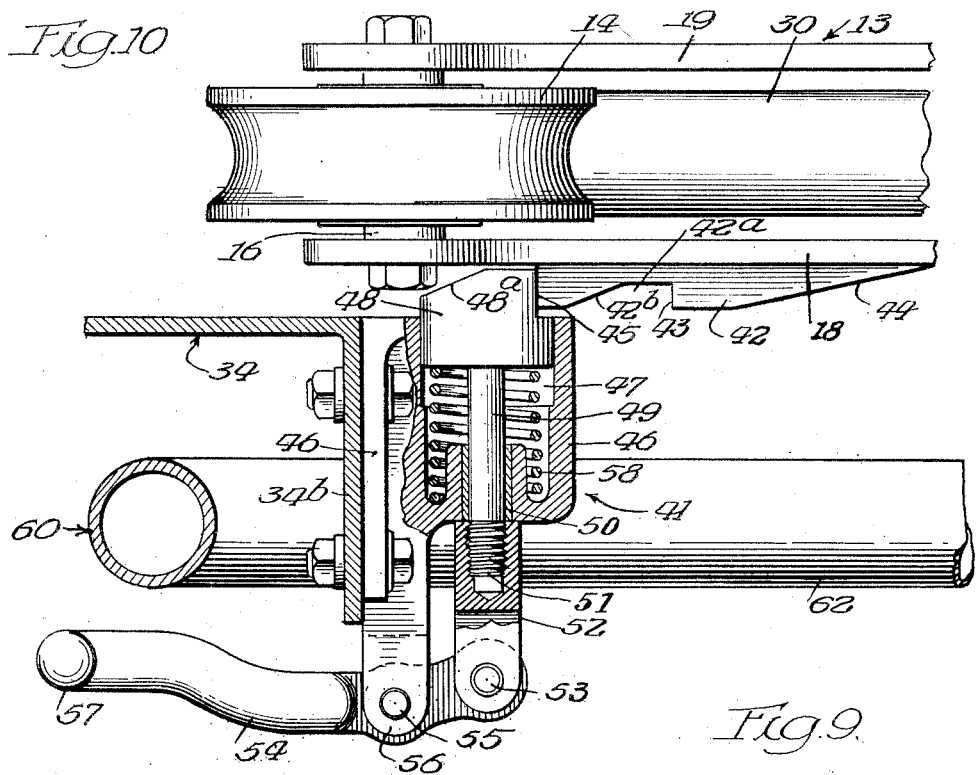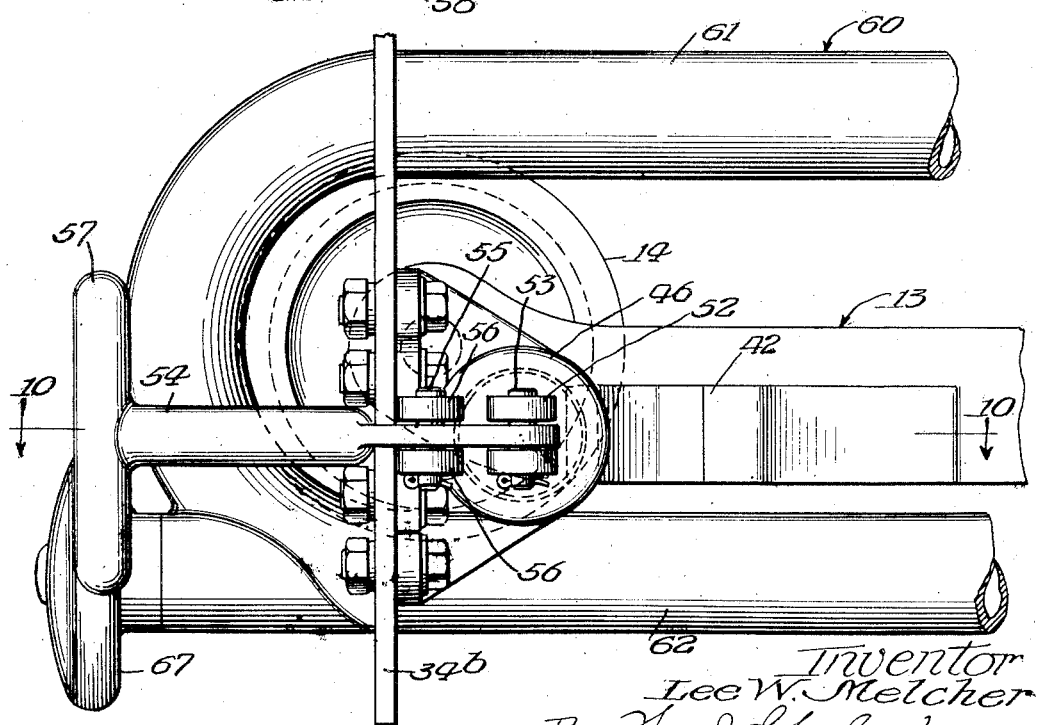

2,497,785

UNITED STATES PATENT OFFICE 2,497,785

MOUNTING STRUCTURE AND EXTENSION TRACKS FOR MECHANICAL UNITS

Lee W. Melcher, Oconomowoc, Wis., assignor to Waukesha Motor Company, Waukesha, Wis.

Application June 2, 1947, Serial No. 751,871

8 Claims. (Cl. 104—89)

This invention involves an improved means for mounting heavy mechanical and electro-mechanical units which must be moved from time to time out of their normal operating locations to more accessible positions in order to facilitate periodic inspections, maintenance operations and repairs. More specifically, the invention is concerned with improved means for mounting underneath the bodies of railway cars such equipment as engine-driven generator units and engine-driven refrigeration or air-conditioning units, and also improved means whereby such units can quickly and easily be moved out from underneath the cars to more accessible exterior positions, so that they can be serviced conveniently and efficiently and just as quickly and easily be moved back to their normal operating positions.

The primary object is to expedite the servicing of units such as those heretofore mentioned or of any type of equipment which requires servicing from time to time and is normally so positioned that it cannot conveniently be serviced without moving it to a different and more accessible position.

A further object is to provide means of the above-indicated character which does not require the services of a skilled mechanic in order to carry out ordinary maintenance operations such as inspections, oiling of machinery, etc.

Still another object is to provide means of the aforementioned type which does not entail any need for mechanical load-handling equipment other than certain extension tracks which form integral parts of the present mounting and, when not in actual use, are stowed underneath the car body where they are readily accessible and always at hand.

An additional object is to provide a mounting wherein a mechanical unit which is normally disposed underneath the body of a railway car is mounted through the medium of rollers on a pair of tracks which are suspended from the car frame and includes a pair of novel track extensions.

The invention is employed not only for carrying out ordinary maintenance and repair operations but also, when it becomes necessary, to remove a unit and replace it with another, as when needed repairs would otherwise involve keeping a car out of service beyond the time allotted for overall servicing between train arrivals at terminal stations and subsequent scheduled departures.

The subject invention is exemplified in the accompanying drawings, wherein:

Fig. 1 is a perspective view illustrating how the invention is employed to mount a mechanical or electro-mechanical unit underneath the body of a railway car, the extension tracks being shown in position to receive the unit when it is rolled out from underneath the car;

Fig. 2 is a perspective view similar to Fig. 1 but from a different point of observation, showing the unit supported upon the extension tracks in position for servicing;

Fig. 3 is a side elevational view, partly in section, showing the unit in its normal position underneath the car body and illustrating the manner of mounting and securing the extension tracks when they are not in use;

Fig. 4 is a side elevational view, partly in section, showing one of the extension tracks in its operative position, and also showing the unit supported upon the extension tracks;

Fig. 5 is a fragmentary front elevational view of one half of the mounting structure, the associated extension track being shown stowed in its normal or passive position which it occupies when the car is in transit;

Fig. 6 is a fragmentary sectional view taken on the line 6—6 of Fig. 3, showing details of construction of one of the two roller-equipped trucks by means of which the mechanical unit is movably mounted on the mounting tracks;

Fig. 7 is a fragmentary front elevational view like Fig. 5, except that the extension track is shown in its operative position after having been withdrawn from its normal or passive position;

Fig. 8 is a perspective view of one of the two main supporting brackets;

Fig. 9 is an enlarged fragmentary side elevational view of one of the latch mechanisms which serve releasably to lock the unit in place underneath the car; and Fig. 10 is a sectional view taken on the line 10—10 of Fig. 9.

The unit 10 is a generally rectangular box-like steel housing within which is contained a machine or combination of machines such, for example, as an engine-driven compressor or an engine-driven electric generator. The nature of the machine or machines within the unit is immaterial to the subject invention, except that it ordinarily is such that there is necessity of obtaining access to the same from time to time for oiling or inspection or other servicing operations which can most readily be performed with the unit moved out from underneath the car to a position such as that in which it is depicted in Figs. 2 and 4.

In Figs. 1 and 2 the car body is shown fragmentarily in dot-dash outline and is identified generally by reference numeral 11.

The unit 10 normally is positioned underneath the car body as shown in Figs. 1 and 3, and may be concealed from view by a door 12 (see Fig. 3) forming a part of the skirt commonly employed on modern railway cars.

Attached to opposite ends of the unit 10 are two trucks 13, each including a pair of wheels or rollers 14 and 15. The latter are journaled on axles 16 and 17 which are secured at their ends to laterally spaced bars 18 and 19, between which the wheels or rollers 14 and 15 are disposed. Bridged between and welded to the bars 18 and 19 of the trucks are plates 20 which are drilled vertically to receive pairs of flanged metal sleeves 21, in each of which is secured by cement or vulcanization a resilient rubber bushing 22, inner sleeves 23 which have heads 23a at their upper ends and serve to transmit the weight of the unit 10 to the rubber bushings 22. Vertical bolts 24 are threaded at their upper ends into bars 25 which are secured between the upper legs 26a and the lower legs 26b of mounting brackets 26 which are welded or otherwise secured to the ends of the unit 10. The two trucks 13 are substantially identical and the weight of the unit 10 is divided therebetween and transmitted thereto by the two brackets 26. Obviously, any appropriate number of rubber bushings 22 may be provided in conformity with the magnitude of the load; and these may be apportioned between the two trucks in accordance with the respective loads carried thereby.

The wheels or rollers 14 and 15 of each truck normally rest upon the tubular lower rail of a fixed mounting track which comprises, in addition to lower rail 30, a tubular upper rail 31, the two rails being parallel and vertically spaced apart to receive the wheels 14 and 15 between them. The wheels are grooved peripherally to suit the curvature of the lower rails. There is clearance between the upper portions of the wheels 14 and 15 and the upper rails 31, but the clearance is quite small so that the wheels cannot bounce off the lower rails to any substantial extent.

The inner ends of the upper and lower rails 30 and 31 are welded to a plate 32 (see Fig. 3) which, in turn, is welded or otherwise secured to a main girder 33 in the form of an I beam.

The outer ends of the rails 30 and 31 are welded to brackets which embody supporting top plates 34a. The latter are bolted to the under side of the side sill of the car, as most clearly shown in Fig. 3. The brackets 34 also embody vertically extending flanges 34b having openings 35 and 36, the purpose of which will be described hereafter.

Normally, the unit 10 is positioned underneath the car, as shown in Fig. 3, with each rear wheel 15 in contact with a bumper 40 consisting of two complementary castings bolted together in clamping engagement with the upper and lower rails 30 and 31. The unit is releasably locked in place by a pair of manually operable latch mechanism 41, one of which is shown in detail in Figs. 9 and 10. Each latch mechanism 41 comprises a strike plate 42 which is welded to the outer surfaces of the adjacent bar 18, is notched at 42a to form a shoulder 43, and is provided with a sloping deflector surface 44. The outer end of each strike plate 42 provides a second shoulder at 45. Each latch mechanism further comprises a cast metal bracket 46 which is bolted to the flange 34b of the adjacent bracket 34. Each bracket 46 is bored to form a socket 47 (see Fig. 10) in which is slidably mounted a latch bolt 48 having a shank 49 slidably journaled in a bronze bushing 50 and threaded at the end 51 to engage a yoke 52 which is pivotally connected at 53 to one arm of an operating lever 54, the latter being fulcrumed at 55 between a pair of arms 56 which are integral parts of the bracket 46. Each lever 54 is provided at its outer end with a handle 57. Coil springs 58 in sockets 47 press outwardly against the latch bolts 48 and normally hold the same in the extended position wherein the latch bolts confront the shoulders 45 and thus function to latch the unit 10 in place. The shoulders 43 are put to use only in event of inadvertent failure to push the unit all the way back against bumpers 40. As is usual with spring latches of this type, the latch bolts 48 are provided with sloping cam surfaces 48a which are adapted to ride on the sloping surfaces 44 of the strike plates 42, whereby to depress the latch bolts against the pressure of the springs 58 when the unit is rolled back into its normal position, as shown in Figs. 1 and 3, from its outward position wherein it is shown in Fig. 4. As the unit is rolled into place, the latch bolts drop first into the notches 42a, but are promptly retracted by the action thereon of the sloping surfaces 42b, and immediately afterward move into their final latching position, as shown in Fig. 10. To withdraw the unit 10 from its normal position, it is necessary first to retract the two latch bolts 48 by means of the levers 54. The latter may be released as soon as the unit has been moved outwardly a sufficient extent to avoid engagement of the latch bolts with the shoulders 43.

As a preliminary to rolling the unit to the outward position in which it is shown in Fig. 2, it is necessary to couple to the fixed mounting tracks comprising rails 30 and 31 two extension tracks 60, each of which consists principally of a length of steel tubing which is bent into U-shape and comprises a lower rail 61 (see Fig. 4). The lower rails 61 are shaped to form continuations of fixed lower rails 30 and the upper rails 62 are shaped to form continuations of the fixed rails 31.

Telescoped into and welded to the free end of each upper rail 62 (see Fig. 4) and projecting outwardly therefrom is a short length of tubing 63, the outside diameter of which is such that it fits closely but slidably within the bore of the adjacent upper rail 31; and each lower rail 61 is similarly provided with a short length of tubing 64 which is adapted to fit slidably within the bore of the adjacent lower rail 30. Thus the upper and lower rails of the extension tracks are held in perfect alignment with the upper and lower rails, respectively, of the fixed tracks, thereby enabling the unit 10 to be rolled out from underneath the car and back again without encountering any irregularity on the tracks such as might tend to obstruct free movement of the unit.

When in use, each extension track is firmly anchored to its fixed track (see Fig. 4) by means of a long tie bolt 65 which extends axially through the bore of the upper rail 62 and through the bore of a tube 63 and makes threaded engagement with a nut 66 secured within the bore of upper rail 31, as by welding thereto. The outer ends of tie bolts 65 are provided with knobs 67 by means of which the tie bolts can be turned manually to effect engagement and disengagement thereof with the nuts 66. It will be apparent that the weight of unit 10 on the extension track puts the tie bolts 65 under tension and the lower rails 61 under lengthwise compression; and it will be further apparent that the design of the extension tracks and manner of anchoring the same makes for a very strong and rigid cantilever construction which is well adapted to support the load to which it is subjected.

Except when the extension tracks are in actual use, they are stowed underneath the car, as shown in Fig. 3, at either end of the unit 10. The two rails of each extension track are passed, respectively, through openings 35 and 36 in the bracket 34. The brackets 34 function as supports for the outer ends of the extension tracks. The two extension tracks are turned upside down—compare Fig. 3 with Fig. 4—so as to provide more clearance around knobs 67. The tie bolts 65 are threaded into the hubs of brackets 68 which are welded to the inner ends of the lower rails 30 and project laterally therefrom. The brackets 68, in addition to being internally threaded to receive the tie bolts, are bored to receive the projecting ends of the tubes 63, as most clearly shown in Fig. 3.

Whenever it is desired to obtain access to the unit 10, the service man withdraws the two extension tracks from their carrying brackets and attaches them to the ends of the fixed tracks and then, after releasing the two latch mechanisms, rolls the unit to the outside position in which it is shown in Figs. 2 and 4. When the servicing operation has been completed, the operator rolls the unit back to its normal position, where it is secured by the two latch mechanisms, and then proceeds to detach the extension tracks and return them to their carrying brackets.

A feature of importance consists in the arrangement, best indicated in Figs. 9 and 10, by virtue of which it is impossible to unlatch and thus release the unit until the two extension tracks have been withdrawn from their normal mountings. This condition results from the fact that the extension tracks are disposed in the paths of movement of their associated latch-releasing levers 54 and handles 57, and will not permit of sufficient movement of those levers to bring about withdrawal of latch bolts 48. It the absence of such an arrangement it would be necessary to padlock the latch mechanisms to prevent operation thereof by unauthorized persons.

By reason of the fact that the rails 30 and 61 are of circular cross-section, there is little opportunity for dirt and ice to accumulate thereon to such an extent as substantially to interfere with free movement of the trucks therealong.

It is, of course, within the purview of this invention to use rails of any suitable cross-sectional configuration—not necessarily tubular—but, on the contrary, the use of tubular rails works to great advantage, particularly as respects economy and efficient mechanical design.

While there has been illustrated and described only that embodiment of the invention which is presently considered to be the preferred form, it will be recognized that there are many possible modifications and alternatives within the scope of the invention, and it is not desired that the invention be regarded as limited save as indicated by the terms of the appended claims.

What is claimed is:

1. In combination, a pair of laterally spaced, horizontal, parallel, fixed tracks supported in suspension from the under side of a car body and extending crosswise of the car, a mobile unit having rollers resting normally on said tracks and adapted to be rolled along said tracks while being supported thereby, said unit being normally positioned underneath the car, latch mechanism operative releasably to lock said unit in its normal position on said fixed tracks, a pair of cantilever extension tracks adapted to be detachably connected, end-to-end, to said fixed tracks, individually, to form temporary continuations of said fixed tracks, the arrangement being such as will enable the mobile unit to be rolled along said track from its normal position underneath the car to a temporary position on said extension tracks out from underneath the car, and means for supporting said extension tracks underneath the car when the same are not in use.

2. In combination, a pair of laterally spaced, horizontal, parallel, fixed tracks supported in suspension from the under side of a car body and extending crosswise of the car, each of said fixed tracks comprising a lower rail and an upper rail, means for holding said upper and lower rails of each fixed track in vertically spaced parallel relation, a mobile unit disposed between said tracks and having two pairs of supporting wheels located at its ends, each pair of wheels resting normally on one of said lower rails, said upper rails being close enough to the tops of said wheels to prevent said wheels from being materially vertically displaced with respect to the lower rails, a pair of extension tracks each comprising a lower rail and an upper rail in vertically spaced parallel relation, each of said extension tracks being adapted to be coupled, end-to-end, to one of said fixed tracks so as to provide an extension of the fixed lower rail and an extension of the fixed upper rail, said extensions when in use projecting laterally beyond the car body whereby said unit may be rolled out from underneath the car body into an accessible position for servicing, the outer ends of the upper and lower rails of each extension track being connected together so that they co-operate to support the weight of said unit.

3. In combination, a pair of laterally spaced, horizontal, parallel, fixed tracks supported in suspension from the under side of a car body and extending crosswise of the car, each of said fixed tracks comprising a tubular lower rail and a tubular upper rail, means for holding said upper and lower rails of each fixed track in vertically spaced parallel relation, a mobile unit disposed normally between said tracks underneath the car and having two pairs of supporting wheels located at its ends, each pair of wheels resting normally on one of said lower rails, a pair of extension tracks each comprising a tubular lower rail and a tubular upper rail in vertically spaced parallel relation, the lower rail of each extension track being adapted to be telescopically coupled, detachably and in end-to-end relation, to the lower rail of one of said fixed tracks, the upper rail of each extension track being adapted to be similarly coupled to the upper rail of its associated fixed track, the upper and lower rails of each extension track being connected together at the ends thereof remote from the fixed tracks, and a pair of tie-bolts each extending axially and individually through the upper rail of one of said extension tracks, said tie-bolts being operative detachably to couple the upper rails of the extension tracks to the upper rails of the fixed tracks, the arrangement being such that said unit can be rolled out from underneath the car body along and off said fixed tracks and onto said extension tracks to an accessible position beyond the car body.

4. In combination, a pair of laterally spaced, horizontal, parallel, fixed tracks supported in suspension from the under side of a car body and extending crosswise of the car, each of said fixed tracks comprising a tubular lower rail and a tubular upper rail, means including a bracket for holding the upper and lower rails of each fixed track in vertically spaced parallel relation, a mobile unit disposed normally between said tracks underneath the car and having two supporting trucks located at opposite ends of the unit, each truck having a pair of wheels resting on the lower rail of one of said fixed tracks and rollable thereon, a pair of extension tracks, each consisting of a length of tubing bent to form laterally spaced parallel upper and lower extension rails, each of said extension tracks being adapted to be detachably coupled in end-to-end relation to one of said fixed tracks, individually, with the lower extension rail forming continuations of the lower fixed rail and the upper extension rail forming a continuation of the upper fixed rail, and a pair of tie-bolts each extending axially through the upper rail of one of said extension tracks and threaded at one end to effect detachable anchoring engagement with the upper rail of the associated fixed track, each of said brackets having a pair of apertures for receiving, respectively, the upper and lower rails of one of said extension tracks whereby to support said extension tracks underneath the car when the extension tracks are not in use, and an additional pair of brackets, each supported by one of said fixed tracks, each of said additional brackets having a socket for reception of one end of the upper rail of one of said extension tracks, said additional brackets each being internally threaded to engage the threaded end of one of said tie-bolts whereby said tie-bolts are effective to secure the extension tracks to said additional brackets.

5. In combination, an overhead supporting structure, a horizontal fixed rail disposed underneath and supported by said structure, a U-shaped extension track comprising two vertically spaced parallel rails and a return bend interconnecting said rails at one end of each, the lower rail of said extension track being adapted to be detachably coupled, end-to-end, to said fixed rail whereby to form a temporary continuation of said fixed rail, which continuation extends out from underneath said supporting structure, and means for detachably anchoring the free end of the upper rail of said extension track to said supporting structure.

6. In combination, an overhead supporting structure, a horizontal, fixed tubular rail disposed underneath and supported by said structure, a U-shaped extension track comprising two horizontal, vertically spaced, parallel tubular rails interconnected at one end of the extension track, the lower rail of said extension track being adapted to be detachably interconnected, telescopically, end-to-end, with said fixed rail to form a temporary continuation thereof which extends out from underneath said supporting structure, and a tie-bolt extending axially through the upper rail of said extension track, said tie-bolt being operative detachably to anchor said upper rail to said supporting structure.

7. The combination with a railway car having a body structure, of a fixed mounting track disposed underneath said body structure and suspended therefrom, said fixed mounting track comprising a horizontal, tubular lower rail and a horizontal, tubular upper rail, said rails being parallel and vertically spaced and extending transversely of the car body, a bracket suspended from said body structure and constituting a support for the outer ends of said rails, a tubular U-shaped extension track comprising a horizontal, tubular lower rail, a horizontal, tubular upper rail and a tubular return bend interconnecting the last-mentioned upper and lower rails at one end of the extension track, the upper and lower rails of said extension track being parallel and vertically spaced so as to register, end-to-end, with the upper and lower rails, respectively, of said fixed track, a tie-bolt extending axially through the upper rail of said extension track and threaded at one end to effect detachable anchoring engagement with the upper rail of the fixed track, the two aforementioned lower rails being adapted to be detachably coupled, end-to-end, so as to form a continuous rail along which a roller-equipped unit normally mounted on the lower rail of the fixed track and normally supported thereby underneath the car can be rolled out from underneath the car and thereafter rolled back to its normal position, and means including said bracket for supporting said extension track underneath the car body when the extension track is not in use, said means also including an internally threaded member for engaging the threaded end of said tie-bolt for securing the extension track in its normal position underneath the car body.

8. The combination with a railway car having a body structure, of fixed horizontal mounting rail disposed underneath said body structure and suspended therefrom and extending transversely thereof, said rail being effective to receive and support a roller equipped unit mounted underneath the car body, said unit being adapted to be rolled along said rail transversely of the car body, a manually releasable latch associated with said rail and normally operative to restrain said unit against outward movement along said rail, whereby to secure said unit in place beneath the car body, an extension rail adapted to be rigidly coupled, end-to-end, to said fixed rail at the outer end of the latter and onto which said unit can be rolled out from underneath the car body, and means for securing said extension rail, when not in use, in a predetermined carrying position underneath the car body, said extension rail being so disposed when thus secured that it functions as an obstruction against releasing movement of said latch mechanism, the arrangement being such that said latch mechanism cannot be actuated to release said unit while said extension rail remains in its normal carrying position underneath the car body.

LEE W. MELCHER.

REFERENCES CITED

The following references are of record in the file of this patent:

UNITED STATES PATENTS

| Number | Name | Date |
| --- | --- | --- |
| 1,541,539 | Webb | June 9, 1925 |
| 1,622,574 | Deady | Mar. 29, 1927 |
| 1,764,354 | Schellentroger et al. | June 17, 1930 |
| 1,810,718 | Lord | June 16, 1931 |
| 2,099,747 | Melcher | Nov. 23, 1937 |
| 2,181,406 | Madden | Nov. 28, 1939 |
| 2,295,405 | Johnson et al. | Sept. 8, 1942 |